United States Patent
Andrassy et al.

(10) Patent No.: US 11,520,817 B2
(45) Date of Patent: Dec. 6, 2022

(54) METHOD AND SYSTEM FOR AUTOMATIC DISCOVERY OF TOPICS AND TRENDS OVER TIME

(71) Applicants: Bernt Andrassy, Munich (DE); Pankaj Gupta, Munich (DE); Subburam Rajaram, Munich (DE)

(72) Inventors: Bernt Andrassy, Munich (DE); Pankaj Gupta, Munich (DE); Subburam Rajaram, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 307 days.

(21) Appl. No.: 16/632,022

(22) PCT Filed: Jul. 16, 2018

(86) PCT No.: PCT/EP2018/069210
§ 371 (c)(1),
(2) Date: Jan. 17, 2020

(87) PCT Pub. No.: WO2019/016119
PCT Pub. Date: Jan. 24, 2019

(65) Prior Publication Data
US 2020/0151207 A1     May 14, 2020

(30) Foreign Application Priority Data

Jul. 17, 2017    (EP) .................................... 17181687

(51) Int. Cl.
*G06F 16/35*     (2019.01)
*G06F 16/93*     (2019.01)
(Continued)

(52) U.S. Cl.
CPC ........ *G06F 16/355* (2019.01); *G06F 16/3347* (2019.01); *G06F 16/93* (2019.01); *G06F 40/242* (2020.01); *G06F 40/30* (2020.01)

(58) Field of Classification Search
CPC .... G06F 16/355; G06F 16/93; G06F 16/3347; G06F 40/242; G06F 40/30
See application file for complete search history.

(56) References Cited

U.S. PATENT DOCUMENTS 9,047,283 B1 * 6/2015 Zhang .................... G06F 40/205
2009/0070346 A1 * 3/2009 Savona ................... G06F 16/35
(Continued)

FOREIGN PATENT DOCUMENTS

WO    WO2017097231 A1    6/2017

OTHER PUBLICATIONS

Blei, David M., and John D. Lafferty. "Dynamic topic models." Proceedings of the 23rd international conference on Machine learning. ACM, 2006. pp. 113-117.
(Continued)

*Primary Examiner* — Alford W Kindred
*Assistant Examiner* — Tiffany Thuy Bui
(74) *Attorney, Agent, or Firm* — Lempia Summerfield Katz LLC

(57) ABSTRACT

A method and system for automatically performing a discovery of topics within temporal ordered text document collections are provided. The method includes generating a bag of words vector for each text document collection using a predefined dictionary. The method also includes iteratively calculating, based on the generated bag of words vectors, for each text document collection, a hidden topic vector representing topics of the respective text document collection using a calculated hidden state vector memorizing a hidden state of all previous text document collections.

14 Claims, 2 Drawing Sheets

(51) Int. Cl.
    *G06F 16/33*     (2019.01)
    *G06F 40/242*    (2020.01)
    *G06F 40/30*     (2020.01)

(56)          References Cited

U.S. PATENT DOCUMENTS

2010/0312769 A1* 12/2010 Bailey .................... G06F 16/35
                                                      707/740
2013/0311471 A1* 11/2013 Okajima ............... G06F 16/345
                                                      707/737
2015/0019204 A1   1/2015 Simard
2018/0143968 A1*  5/2018 Yang ..................... G06F 16/355
2018/0336207 A1* 11/2018 Dunne ................... G06F 16/35

OTHER PUBLICATIONS

Bolelli, Levent, Şeyda Ertekin, and C. Lee Giles. "Topic and trend detection in text collections using latent dirichlet allocation." European Conference on Information Retrieval. Springer, Berlin, Heidelberg, 2009. pp. 776-778.

European Search Report for European Patent Application No. 17181687.9-1871 dated Oct. 4, 2017.

PCT International Search Report and Written Opinion of International Searching Authority dated Sep. 10, 2018 corresponding to PCT International Application No. PCT/EP2018/069210 filed Jul. 16, 2018.

Wang, Xuerui, and Andrew McCallum. "Topics over time: a non-Markov continuous-time model of topical trends." Proceedings of the 12th ACM SIGKDD international conference on Knowledge discovery and data mining. ACM, 2006. pp. 424-433.

* cited by examiner

METHOD AND SYSTEM FOR AUTOMATIC DISCOVERY OF TOPICS AND TRENDS OVER TIME

This application is the National Stage of International Application No. PCT/EP2018/069210, filed Jul. 16, 2018, which claims the benefit of European Patent Application No. EP17181687.9, filed Jul. 17, 2017. The entire contents of these documents are hereby incorporated herein by reference.

BACKGROUND

The present embodiments relate to a method and a system for automatic discovery of topics within temporal ordered text document collections.

Topic detection and tracking systems perform natural language processing to find topics over time in a sequence of text collections that exhibit temporal relationships. Probabilistic topic models have been used in the past to extract semantic topics from text documents. Probabilistic topic models such as Latent Dirichlet Allocation LDA have been investigated to examine the emergence of topics from a sequence of text documents. These conventional methods compute a topic distribution on all text collections to detect and track different topics. However, these conventional methods do not take into account the dependencies between different text collections over time in an evolutional process. Accordingly, conventional methods do not take into account temporal latent topic dependencies between topic collections evolving over time and forming a temporal sequence of text document collections. Consequently, conventional methods cannot capture topic trends and/or keyword trends accurately.

SUMMARY AND DESCRIPTION

The scope of the present invention is defined solely by the appended claims and is not affected to any degree by the statements within this summary.

The present embodiments may obviate one or more of the drawbacks or limitations in the related art. For example, I a method and system for providing a precise topic detection and tracking within temporal ordered text document collections are provided.

The present embodiments provide, according to a first aspect, a method for automatically performing a discovery of topics within temporal ordered text document collections. The method includes generating a bag of words vector for each text document collection using a predefined dictionary. Based on the generated bag of words vectors, a hidden topic vector representing topics of the respective text document collection is iteratively calculated for each text document collection using a calculated hidden state vector memorizing a hidden state of all previous text document collections.

In a possible embodiment of the method according to the first aspect, topic trends are derived from the calculated hidden topic vectors of the text document collections.

In a further possible embodiment of the method according to the first aspect, each text document collection includes one or more text documents published or output at the same time and including an associated time stamp indicating the time of publication or output.

In a further possible embodiment of the method according to the first aspect, a sequence of text document collections is sorted according to the associated time stamps to assign time steps to the text document collections.

In a further possible embodiment of the method according to the first aspect, a hidden topic vector $h_t$ representing topics of a text document collection at a time step t is calculated from the bag of words vector $v_t$ of this time step t and from the hidden state vectors $u_{t-1}$ of the preceding time step t-1, which is computed from the hidden topic vector $h_{t-1}$ at that preceding time step t-1 and a preceding hidden state vectors $u_{t-2}$ at time step t-2.

In a further possible embodiment of the method according to the first aspect, the calculated hidden topic vector h of a text document collection includes a hidden topic probability vector indicating occurrence probabilities of different topics within the respective text document collection.

In a further possible embodiment of the method according to the first aspect, the generated bag of words vector of a text document collection indicates occurrence numbers of words within the respective text document collection.

In a still further possible embodiment of the method according to the first aspect, a two-layered recurrent neural network, RNN—replicated softmax model, RSM, is used to calculate the hidden topic vectors for the text document collections of a sequence of text document collections.

In a still further possible embodiment of the method according to the first aspect, the two-layered RNN-RSM model includes an RSM layer including time-ordered hidden state vectors and associated bag of words vectors for text document collections and an RNN hidden layer including the hidden state vectors.

In a further possible embodiment of the method according to the first aspect, the discovered topics are automatically evaluated to control a process.

In a further possible embodiment of the method according to the first aspect, the text document collection includes text files including words of a natural language consisting of characters.

In a still further possible embodiment of the method according to the first aspect, the text document collection includes source code files written in a programming language.

In a still further possible embodiment of the method according to the first aspect, the text document of a text document collection describes features of a technical system.

The present embodiments further provide, according to a second aspect, a topic discovery system.

The present embodiments provide, according to the second aspect, a topic discovery system for automatic discovery of topics and trends within temporal ordered text document collections. The topic discovery system includes a repository that stores temporal ordered text document collections and a processor configured to generate a bag of words vector for each text document collection using a predefined dictionary. The processor is also configured to iteratively calculate for each text document collection a hidden topic vector representing topics of the respective text document collection based on the generated bag of words vectors using a calculated hidden state vector memorizing a hidden state of all previous text document collections.

In a possible embodiment of the topic discovery system according to the second aspect, the processor is further adapted to automatically derive topic trends from the discovered topics of the text document collections.

In a further possible embodiment of the topic discovery system according to the second aspect, the topic discovery system includes an interface to output the discovered topics and/or topic trends.

DETAILED DESCRIPTION

Figure 1:
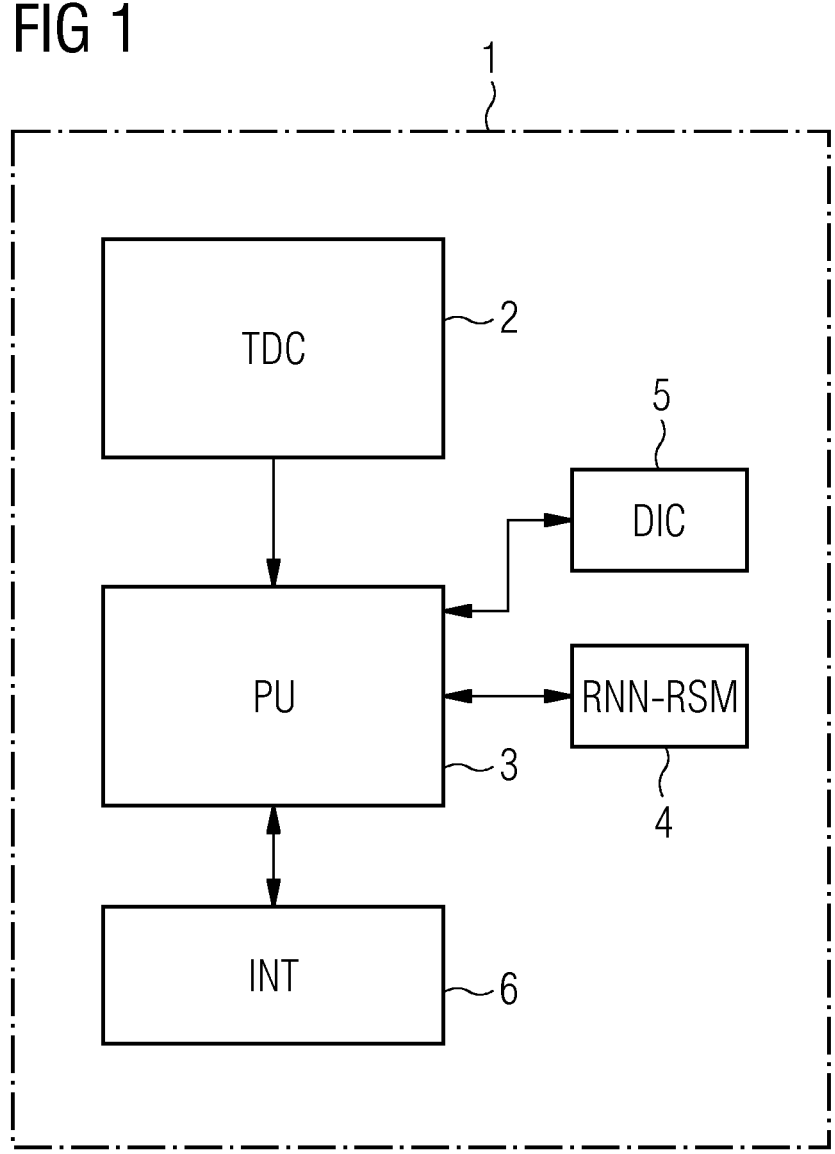
FIG. 1 shows a block diagram for illustrating a possible exemplary embodiment of a topic discovery system.
Figure 2:
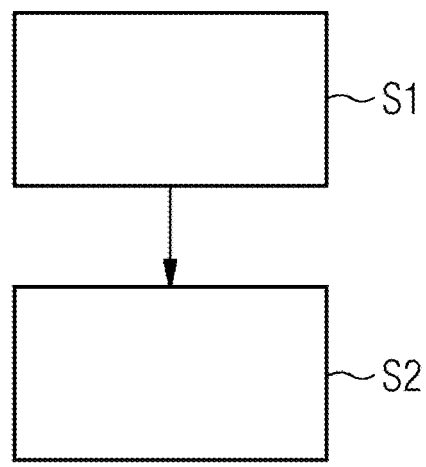
FIG. 2 shows a flowchart of a possible exemplary embodiment of a method for automatically performing a discovery of topics.

As shown in the block diagram of FIG. 1, a topic discovery system 1 according to an aspect may include, in a possible embodiment, several (e.g., three or more) main components. The topic discovery system 1, as shown in FIG. 1, provides an automatic discovery of topics and trends within temporal ordered text document collections. In the illustrated embodiment of FIG. 1, the topic discovery system 1 includes a repository or database where the timestamped or temporal ordered text document collections are stored. In the illustrated embodiment of FIG. 1, the repository 2 includes a local memory or database that stores timestamped or already temporal ordered or sorted text document collections. In an alternative embodiment, the repository or database 2 may be a remote database connected to the topic discovery system 1. In the shown embodiment of FIG. 1, the topic discovery system 1 includes a processing unit or a processor 3 having access to the database or repository 2 where the timestamped or temporal ordered text document collections TDCs are stored. The processor 3 has further access in the illustrated embodiment to a memory 4 storing a two-layered RNN-RSM model that may be used for calculating hidden topic vectors h by the processor 3. The processor 3 is adapted first to generate a bag of words vector v for each text document collection TDC using a predefined dictionary. In a possible implementation, the predefined dictionary DIC may be stored in a further memory 5, as shown in FIG. 1. The processor 3 is further adapted to iteratively calculate for each text document collection TDC stored in the database 2 a hidden topic vector h representing topics of the respective text document collection TDC based on the generated bag of words vectors v using a calculated hidden state vector u memorizing a hidden state of all previous text document collections TDCs. In a possible embodiment, the processor 3 is further adapted to automatically derive topic trends from the discovered topics of the text document collections TDCs. In the illustrated embodiment of FIG. 1, the topic discovery system 1 further includes an interface 6 for outputting the discovered topics and/or topic trends.

Each text document collection TDC stored in the repository 2 may include one or more text documents or text files. Each text document may include a plurality of words, where each word may consist of characters. Each text document collection TDC includes one or more text documents that have been published or output by a system at the same time. Accordingly, each text document collection TDC includes, in an embodiment, an associated time stamp TS. This time stamp TS may be automatically generated in a possible embodiment when the text documents of the text document collection TDC are published or output by the system. In a further possible embodiment, the time stamps TS are assigned by a user when the text documents of the text document collection TDC are published or output. The time stamps TS indicate a time of publication or a time of outputting the text documents. Each text document collection TDC may include an individual plurality of different kinds of text documents. In a possible embodiment, the text documents include text files including words of a natural language, where each word consists of one or several characters (e.g., one or more characters). In a possible implementation, the text document collection TDC may also include source code files written in a programming language. Each text document of a text document collection TDC describes one or several features of a technical system in a possible implementation. This technical system may, for example, be a machine or a technical assembly of one or several (e.g., one or more) components. These components may include hardware components and/or software components.

In a possible embodiment, the text documents of a text document collection TDC are generated automatically by a text document generation unit. In an alternative embodiment, the text documents are generated by a user using a keyboard or by a voice recognition system. In a possible embodiment, the text documents are timestamped and temporally ordered. All text documents having the same time stamp TS belong to the same text document collection TDC. In a possible embodiment, the different text document collections TDCs each including one or several (e.g., one or more) text documents are sorted in a temporal order according to the corresponding time stamps TS. In a possible implementation, the text document collections TDCs are ordered according to the time when the text document collections TDCs have been published or output by a technical system. In an alternative embodiment, the text document collections TDCs are ordered according to the time when the text document collections TDCs have been generated or produced. The text documents belonging to the same text document collection TDC include the same time of production and/or the same time of publication. For example, a text document collection TDC may include a number N of text documents having been output or published by a system within the same day, week, or year. Further, each text document collection TDC may also include all text documents that have been output by a technical system within the same periodic time interval of, for example, within the same minute. Time stamps TS are automatically generated and assigned to the different text documents generated or output at the same time or within the same time period of a predefined time grid. Different text documents having the same time stamps TS are collected within a text document collection TDC. Further, the different text document collections TDCs each having an associated time stamp TS may be stored in the database 2 and may then be sorted or ordered according to the corresponding time stamps. In a possible implementation, text document collections TDCs may belong to a series of text documents published by the same medium such as a newspaper or a technical journal. For example, the different text documents may include different articles or files of a periodically published technical journal. However, the text documents may also belong to documentation documents documenting a technical system or a group of text documents generated by a machine for monitoring purposes. Another example for a series of text documents are reports generated by a user. For example, a doctor may document a healing process of a patient by generating associated text documents. For example, the doctor may dictate health reports that are converted automatically into associated text documents with corresponding time stamps. Text documents of the same day or week may be sampled to form part of a text document collection TDC. Accordingly, the text document collection TDC may include several (e.g., three or more) text documents describing a patient's progress over time.

Accordingly, each text document collection TDC may include one or more text documents generated or published at the same time or within the same time period and including an associated time stamp TS indicating the respective time of generation or publication. A sequence of text document collections TDCs may be sorted automatically according to the associated time stamps TS to assign time steps to the different text document collections TDCs.

The processor or processing unit 3 of the topic discovery system 1, as shown in FIG. 1, generates in a first processing act a bag of words vector v for each text document collection TDC by using a predefined dictionary DIC stored in the memory 5, as shown in FIG. 1. In a possible embodiment, the topic discovery system 1 uses a single dictionary (e.g., the dictionary of common English words including several thousand different common words used in the English language). This dictionary may, for example, include 65,000 common words used in the natural language English. The generated bag of words vector v of a text document collection TDC indicates occurrence numbers of different words within the respective text document collection TDC. For example, a word may be used a hundred times in the text document collection TDC, and another word has not been used at all. The corresponding entry within the bag of words vector v indicates how often the respective word has occurred within the text document collection TDC. In a further possible embodiment, several different dictionaries DIC may be stored in the memory 5. In a possible implementation, the dictionary DIC may be selected from a set of dictionaries stored in the memory 5 according to a topic domain and/or depending on the language of the text documents. For example, if the topic domain collection TDC includes only text documents in English, an English word dictionary DIC is selected. If the topic domain collection includes further natural languages, other dictionaries may be selected as well. Further, the text document collections TDCs may include natural language documents but also text documents written in predefined technical languages (e.g., programming languages). In a possible implementation, the type of the text documents forming part of the text document collections TDC is indicated, and a matching dictionary DIC is automatically selected. After one or several dictionaries (e.g., one or more dictionaries) have been selected, the processor 3 may automatically generate a bag of words vector v for each text document collection TDC using the selected dictionaries DIC. In a further processing act, the processing unit 3 may, based on the generated bag of words vectors v, calculate for each text document collection TDC read from the memory 2 iteratively a hidden topic vector h representing topics of the respective text document collection TDC using a calculated hidden state vector u that does memorize a hidden state representing previous text document collections TDC.

After having calculated the hidden topic vector for each text document collection TDC, the processing unit 3 may, in a further processing act, automatically derive topic trends from the calculated hidden topic vectors of the text document collections TDCs. In a possible embodiment, topic trends are output by the topic discovery system 1 via the interface 6 for further processing and/or for performing an automatic control of a system. In a possible embodiment, the discovered topics may be further automatically processed or evaluated to generate control signals output via the interface 6 to control actuators of a technical system. In a further possible embodiment, a text document of a text document collection TDC may also be input into the topic discovery system 1, as shown in FIG. 1, via the interface 6. The input text documents are stored in the database 2 according to corresponding assigned time stamps. In a further alternative embodiment, the text document collection TDC is not read by the processing unit 3 from a memory 2, as shown in FIG. 1, but is received via an interface in a text document collection data stream. In this alternative embodiment, time-stamped text document collections TDCs may be received in a temporal order or sequence via a data network connected to the topic discovery system 1.

The processing unit 3 is adapted to calculate a hidden topic vector h representing topics of the different text document collections TDCs using a model stored in the local memory 4, as shown in FIG. 1. In a possible embodiment, a hidden topic vector $h_t$ representing topics of a text document collection TDC at a time step t is calculated from the bag of words vector $v_t$ of this time step t and from the hidden state vector $u_{t-1}$ of the preceding time step t-1. The hidden state vector $u_{t-1}$ of the preceding time step t-1 is computed in an exemplary embodiment from the hidden topic vector $h_{t-1}$ at the preceding time step t-1 and a preceding hidden state vector $u_{t-2}$ at a time step t-2. The calculated hidden topic vector h of a text document collection TDC includes, in a possible embodiment, a hidden topic probability vector indicating an occurrence probability of the different topics within the respective text document collections TDCs.

In a possible embodiment, the method uses a two-layered recurrent neural network, RNN-replicated softmax model RSM to calculate the hidden topic vectors h for the text document collections TDCs of a sequence of text document collections TDCs. This two-layered RNN-RSM model includes, in an embodiment, an RSM layer including time-ordered hidden state vectors and associated bag of words vectors v for all text document collections TDCs and also an RNN hidden layer including the hidden state vector u.

Figure 3:
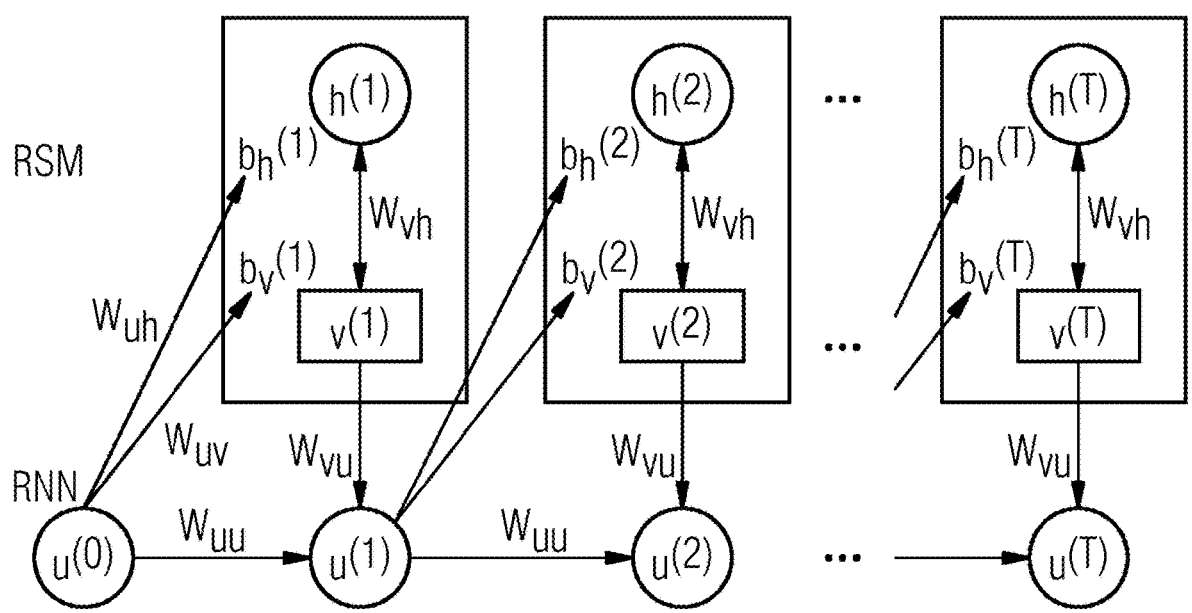
FIG. 3 illustrates one embodiment of a two-layered RNN-RSM model used for calculating hidden topic vectors.

Such a two-layered RNN-RSM model is illustrated in FIG. 3. The model shown in FIG. 3 may be stored in a local memory 4 of the topic discovery system 1 and may include a two-layered model structure. The model shown in FIG. 3 includes an RSM layer and an RNN layer. The RSM layer includes the time-ordered hidden state vectors h and associated bag of words vectors v. The two-layered model further includes an RNN hidden layer including the hidden state vectors u, as shown in FIG. 3.

In the illustrated embodiment of FIG. 3, the model used by the processing unit 3 includes an RNN-RSM model, a sequence of conditional RSMs such that at any time step t, the bias parameters $b_v$ and $b_h$ of the RSM depend on the output of a deterministic RNN with hidden layer $u_{t-1}$ in the previous time step t-1. The bag of words vectors v form visible portions. The V units are multinominal, while the h units are stochastic binary. The RNN hidden units u are constrained to convey temporal information, while the RSM hidden units h model conditional distributions. Consequently, parameters $b_v$, $b_h$, $W_{vh}$ are time-dependent on the sequence history at time t (e.g., via a series of conditional RSMs) noted by θt, where θt=$\{v_\tau, u_\tau | \tau < t\}$, which captures temporal dependencies. The RNN-RSM model may be defined by a joint probability distribution:

$$P(\{V, H\}) = \prod_{t=1}^{T} P(v^{(t)}, h^{(t)} | \theta^{(t)}) \qquad (1)$$

where $V=[v^1 \ldots v^r]$ and
$H=[h^1 \ldots h^r]$,
and where $h^t \in \{0, 1\}$ is a binary stochastic hidden topic and $v^t \in \{1, \ldots K\}^D$ is the discrete visible unit. K is a dictionary size, and D is the number of documents published at the same time.

The conditional distribution in each RSM at time step t may be given by a softmax and logistic functions as follows:

$$p(v_i^{k,(t)} = 1|h^{(t)}) = \frac{\exp\left(b_{vi}^{k,(t)} + \sum_{j=1}^{F} h_j^{(t)} W_{ij}^k\right)}{\sum_{q=1}^{k} \exp\left(b_{vi}^{q,(t)} + \sum_{j=1}^{F} h_j^{(t)} W_{ij}^k\right)} \quad (2)$$

$$p(h_j^{(t)} = 1|v^{(t)}) = \sigma\left(b_h^{(t)} + \sum_{i=1}^{D}\sum_{k=1}^{K} v_i^{k,(t)} W_{ij}^k\right) \quad (3)$$

where $p(v_i^{k,(t)}=1|h^{(t)})$ and $p(h_j^{(t)}=1|v^{(t)})$ define the conditional distributions for a visible unit, $v_i$ and hidden unit $h_j$ at time step t. $v^{k,(t)}$ is sampled D times with identical weights connecting to binary hidden units, resulting in multinominal visibles and, therefore, the name Replicated Softmax.

While biases b of RSM depend on the output of RNN at previous time steps that allows to propagate the estimated gradient at each RSM (with respect to biases) backward through time (BPTT), the RSM biases at each time step t are given by:

$$b_v^{(t)}=b_v+W_{uv}u^{(t-1)}; b_h^{(t)}=b_h+W_{uh}u^{(t-1)} \quad (4)$$

where $W_{uv}$ and $W_{uh}$ are the weight parameters between hidden unit u and input v, and u and h, respectively. The RNN hidden state $u^{(t)}$ may be computed by:

$$u^{(t)}=\tan h(b_u+W_{uu}u^{(t-1)}+W_{uv}v^{(t)}) \quad (5)$$

where $b_u$ is the bias of u. $W_{uu}$ is the weight parameter between RNN hidden units, while $W_{vu}$ is the weight parameter between the visible unit v and hidden unit u.

RSM is an energy-based model, where energy of the state $\{v^{(t)}, h^{(t)}\}$ at time step t is given by:

$$E(v^{(t)},h^{(t)})=-\sum_{j=1}^{F}\sum_{k=1}^{K} h^j W^{jk} \hat{v}^k - \sum_{k=1}^{K} \hat{v}^k b_v^k - D\sum_{j=1}^{F} b_h^j h^j \quad (6)$$

$\hat{v}^k = \sum_{i=1}^{D} v_i^k$ denotes the count for the $k^{th}$ word. The energy and probability are related by:

$$P(v^{(t)}) = \frac{1}{Z} \sum_{h^{(t)}} \exp(-E(v^{(t)}, h^{(t)})) \quad (7)$$

where $Z=\sum_{v^{(t)}}\sum_{h^{(t)}}\exp(-E(v^{(t)}, h^{(t)}))$ is a normalization constant.

In a further possible embodiment, the RNN-RSM model may be trained. In a possible embodiment, the RNN-RSM model may be trained with BPTT.

The cost function in RNN-RSM model is given by $C \equiv -\log P(v^{(t)})$. Training with respect to nine parameters ($W_{uh}$, $W_{vh}$, $W_{vu}$, $W_{uu}$, $b_v$, $b_h$, $b_v^{(t)}$, $b_h^{(t)}$, $u^{(0)}$) may follow in a possible embodiment with the following acts at each iteration: 1. Propagate deterministic hidden units $u^{(t)}$ in RNN portion using equation (5); 2. Compute RSM parameters $b_v^{(t)}$ and $b_h^{(t)}$, dependent on RNN hidden units, in equation (4); 3. Reconstruct the visibles (e.g., negative samples $v^{(t)*}$ using k-step Gibbs sampling); 4. Estimate the gradient of the cost C using the negative samples as:

$$\frac{\partial C}{\partial \theta^{(t)}} \simeq \frac{\partial F(v^{(t)})}{\partial \theta^{(t)}} - \frac{\partial F(v^{(t)*})}{\partial \theta^{(t)}} \quad (8)$$

where the free energy $F(v^{(t)})$ is related to normalized probability of $v^{(t)}$ as $P(v^{(t)}) \equiv \exp^{-F(v^{(t)})}/Z$ and is given by:

$$F(v^{(t)})=-\sum_{k=1}^{K} v^{k(t)} b_v^k - \sum_{j=1}^{F} \log(1+\exp(Db_h^j+\sum_{k=1}^{K} v^{k(t)} W^{jk})) \quad (9)$$

The gradient with respect to RSM parameters is approximated by Contrastive Divergence (CD); using equations (8) and (9):

$$\frac{\partial C}{\partial b_v^{(t)}} \simeq v^{(t)*} - v^{(t)} \quad (10)$$

$$\frac{\partial C}{\partial b_h^{(t)}} \simeq \sigma(Wv^{(t)*} - b_h^{(t)}) - \sigma(Wv^{(t)} - b_h^{(t)}) - \frac{\partial C}{\partial W_{vh}} \simeq$$

$$\sum_{t=1}^{T} \sigma(Wv^{(t)*} - b_h^{(t)})v^{(t)*} - \sigma(Wv^t - b_h^t)v^t$$

At each iteration, the training may also include: 5. Backpropagate the estimated gradient with respect to RSM biases via hidden-to-bias parameters to compute gradients with respect to deterministic RNN connections ($W_{uv}$, $W_{uu}$, $W_{vu}$, $u^0$) and biases ($b_v$, $b_h$).

In a possible implementation, an average span of selected keywords may be calculated as follows:

$$span_{avg}(Q) = \frac{1}{|Q|} \sum_{i \in Q} \frac{span_i}{v^i} \quad (11)$$

where Q is the set of words appearing in topics over the years extracted by the topic model. The used RNN-RSM model captures longer spans for keywords or trends compared to conventional models. The RNN-RSM model may be used for temporal topic modeling and/or for trend analysis.

The method and system 1 according to one or more of the present embodiments may be used for a variety of use cases. The method and system 1 for providing automatic topic discovery of topics may be used for any kind of temporal ordered text document collections TDC published or generated over time. The method and system 1 may be used for detecting topics and for tracking different topics over time. The detected topic may trigger a control or monitoring routine for a technical system. Further, the detected topic or trend may trigger a process such as a repair or maintenance process for a machine. Further, the discovered topics may be evaluated or processed to calculate automatically trends within the text document collections TDC to make predictions for the future development within a technical domain or for an investigated technical system. The text documents sorted in the ordered sequence of text document collections TDC may originate from the same or different text-generating sources. The text documents may be produced by different users and/or generated by different technical hardware or software components of a technical system. The method and system 1 according to one or more of the present embodiments are able to capture longer trends of discovered topics over time, allowing to make more accurate predictions and to initiate more suitable measures or processes depending on the discovered topics.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for automatically performing a discovery of topics and trends within temporal ordered text document collections, the method comprising:
generating a bag of words vector for each text document collection of the temporal ordered text document collections using a predefined dictionary, wherein the generated bag of words vector of a text document collection of the temporal ordered text document collections indicates occurrence numbers of different words within the respective text document collection;
iteratively calculating, based on the generated bag of words vectors, for each text document collection of the temporal ordered text document collections, a hidden topic vector representing topics of the respective text document collection using a calculated hidden state vector memorizing a hidden state of all previous text document collections of the temporal ordered text document collections.

2. The method of claim 1, further comprising deriving topic trends from the calculated hidden topic vectors of the temporal ordered text document collections.

3. The method of claim 1, wherein each text document collection of the temporal ordered text document collections comprises one or more text documents published or output at a same time and comprising an associated time stamp indicating a time of publication.

4. The method of claim 1, further comprising sorting a sequence of text document collections of the temporal ordered text document collections according to associated time, such that time steps are assigned to the text document collections.

5. The method of claim 4, further comprising calculating a hidden topic vector representing topics of a text document collection of the temporal ordered text document collections at a time step from the bag of words vectors at the time step and from hidden state vectors of a preceding time step that precedes the time step, the hidden state vectors of the preceding time step being computed from the hidden topic vector at the preceding time step and preceding hidden state vectors at a time step that precedes the preceding time step.

6. The method of claim 1, wherein the calculated hidden topic vector of a text document collection of the temporal ordered text document collections comprises a hidden topic probability vector indicating occurrence probabilities of different topics within the respective text document collection.

7. The method of claim 1, wherein a two-layered recurrent neural network (RNN)—replicated softmax model (RSM) (RNN-RSM) is used to calculate hidden topic vectors for text document collections of a sequence of text document collections of the temporal ordered text document collections.

8. The method of claim 7, wherein the two-layered RNN-RSM model comprises:
an RSM layer including time-ordered hidden state vectors and associated bag of words vectors for all text document collections of the temporal ordered text document collections; and
an RNN hidden layer including the hidden state vectors.

9. The method of claim 1, further comprising automatically evaluating the discovered topics such that a process is controlled.

10. The method of claim 1, wherein a text document collection of the temporal ordered text document collections comprises text files including words of a natural language consisting of characters, source code files written in a programming language, or a combination thereof.

11. The method of claim 1, wherein a text document of a text document collection of the temporal ordered text document collections describes features of a technical system.

12. A topic discovery system for automatic discovery of topics within temporal ordered text document collections, the topic discovery system comprising:
a repository configured to store the temporal ordered text document collections; and
a processor configured to:
generate a bag of words vector for each text document collection of the temporal ordered text document collections using a predefined dictionary, wherein the generated bag of words vector of a text document collection of the temporal ordered text document collections indicates occurrence numbers of different words within the respective text document collection; and
iteratively calculate for each text document collection of the temporal ordered text document collections a hidden topic vector representing topics of the respective text document collection using a calculated hidden state vector memorizing a hidden state of all previous text document collections.

13. The topic discovery system of claim 12, wherein the processor is further configured to automatically derive topic trends from the discovered topics of the text document collections.

14. The topic discovery system of claim 13, further comprising an interface configured to output the discovered topics, the derived topic trends, or the discovered topics and the derived topic trends.

* * * * *